United States Patent
Long et al.

(10) Patent No.: US 8,570,733 B2
(45) Date of Patent: Oct. 29, 2013

(54) FASTENING DEVICE FOR DATA STORAGE DEVICE

(75) Inventors: Ling Long, Shenzhen (CN); Li-Ren Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 4 days.

(21) Appl. No.: 13/424,389

(22) Filed: Mar. 20, 2012

(65) Prior Publication Data

US 2013/0112632 A1    May 9, 2013

(30) Foreign Application Priority Data

Nov. 3, 2011    (CN) .............................. 201110341662

(51) Int. Cl.
    *H05K 7/00*    (2006.01)
(52) U.S. Cl.
    USPC ........................................ 361/679.33; 211/26
(58) Field of Classification Search
    USPC .................. 211/26, 26.2; 361/679.33–679.39
    See application file for complete search history.

(56) References Cited

U.S. PATENT DOCUMENTS

| | | | |
|---|---|---|---|
| 6,098,814 A * | 8/2000 | Ma ................................. | 211/26 |
| 6,667,879 B2 * | 12/2003 | Salinas et al. ............ | 361/679.58 |
| 6,826,045 B2 * | 11/2004 | Chen ......................... | 361/679.33 |
| 6,944,016 B2 * | 9/2005 | Chen et al. ................ | 361/679.33 |
| 7,068,502 B2 * | 6/2006 | Chen et al. ................ | 361/679.39 |
| 7,355,846 B1 * | 4/2008 | Chen et al. ................ | 361/679.33 |
| 7,369,403 B2 * | 5/2008 | Chen et al. ................ | 361/679.33 |
| 7,382,610 B2 * | 6/2008 | Lin et al. .................... | 361/679.33 |
| 7,403,381 B2 * | 7/2008 | Chen et al. ................ | 361/679.33 |
| 7,440,272 B2 * | 10/2008 | Chen et al. ................ | 361/679.33 |
| 7,477,512 B2 * | 1/2009 | Sung ......................... | 361/679.33 |
| 7,542,278 B2 * | 6/2009 | Liu et al. ................... | 361/679.33 |
| 7,542,280 B2 * | 6/2009 | Hong et al. ................ | 361/679.33 |
| 7,571,884 B2 * | 8/2009 | Chen et al. ................ | 248/291.1 |
| 7,576,984 B2 * | 8/2009 | Chen et al. ................ | 361/679.33 |
| 7,701,702 B2 * | 4/2010 | Chen et al. ................ | 361/679.33 |
| 7,916,464 B2 * | 3/2011 | Chen ......................... | 361/679.33 |
| 7,990,697 B2 * | 8/2011 | Yeh et al. ................... | 361/679.33 |
| 8,059,395 B2 * | 11/2011 | Zhang et al. .............. | 361/679.33 |
| 8,064,195 B2 * | 11/2011 | Zhang et al. .............. | 361/679.33 |
| 8,085,530 B2 * | 12/2011 | Zhang et al. .............. | 361/679.33 |
| 8,118,270 B2 * | 2/2012 | Hsieh et al. ............... | 248/220.21 |
| 8,159,816 B2 * | 4/2012 | Chen ......................... | 361/679.33 |
| 8,203,835 B2 * | 6/2012 | Yeh et al. ................... | 361/679.33 |
| 8,243,433 B2 * | 8/2012 | Yeh et al. ................... | 361/679.33 |
| 2006/0232924 A1 * | 10/2006 | Liu et al. ........................ | 361/685 |

(Continued)

*Primary Examiner* — Jonathan Liu
*Assistant Examiner* — Stanton L Krycinski
(74) *Attorney, Agent, or Firm* — Altis & Wispro Law Group, Inc.

(57) ABSTRACT

A fastening device for fastening a data storage device includes a rack and a fastening member. The rack includes a bottom plate to support the data storage device, and two stop tabs protruding up from the bottom plate to abut against a first sidewall of the data storage device. Two first pins respectively extend from the stop tabs to engage in two corresponding holes defined in the first sidewall of the data storage device. The fastening member includes a main body attached to the bottom plate to abut against a second sidewall of the data storage device, and a resilient portion extending from the main body. A second pin protrudes from the resilient portion to engage in a locking hole defined in the second sidewall of the data storage device.

5 Claims, 4 Drawing Sheets

(56) References Cited

U.S. PATENT DOCUMENTS

2008/0144274 A1* 6/2008 Chen et al. .................... 361/685
2008/0144275 A1* 6/2008 Chen et al. .................... 361/685
2010/0142159 A1* 6/2010 Lee et al. ...................... 361/747
2010/0259883 A1* 10/2010 Yeh et al. .................. 361/679.33
2011/0128693 A1* 6/2011 Zhang et al. ............. 361/679.33
2011/0141683 A1* 6/2011 Zhang et al. ............. 361/679.33

* cited by examiner

FASTENING DEVICE FOR DATA STORAGE DEVICE

BACKGROUND

1. Technical Field

The present disclosure relates to means of fastening data storage devices.

2. Description of Related Art

An electronic device, such as a computer, may be equipped with data storage devices, such as an optical disk drive. Mounting the optical disk drive to the electronic device with screws is inefficient and requires the use of a tool, such as a screwdriver, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
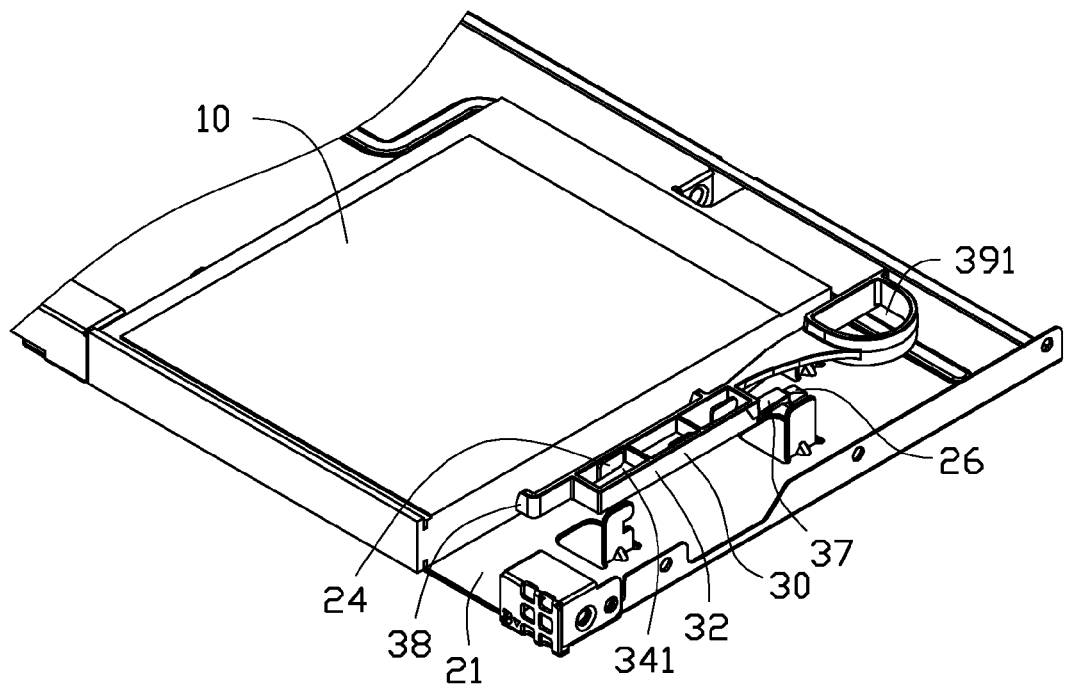
FIG. 1 is an assembled, isometric view of an exemplary embodiment of a fastening device, together with an optical disk drive (ODD), wherein the fastening device includes a fastening member.
Figure 2:
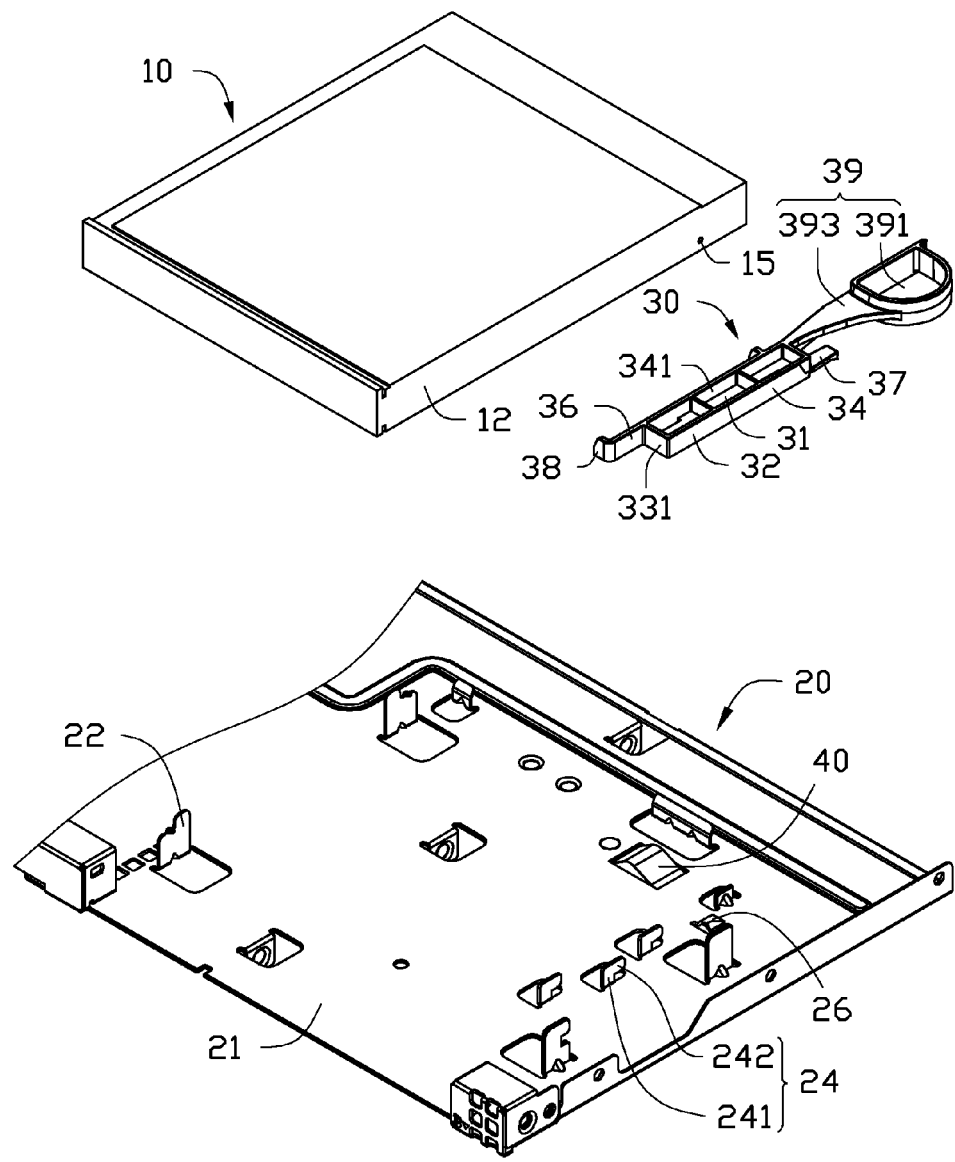
FIGS. 2 and 3 are exploded, isometric views of FIG. 1, but viewed from different perspectives.
Figure 3:
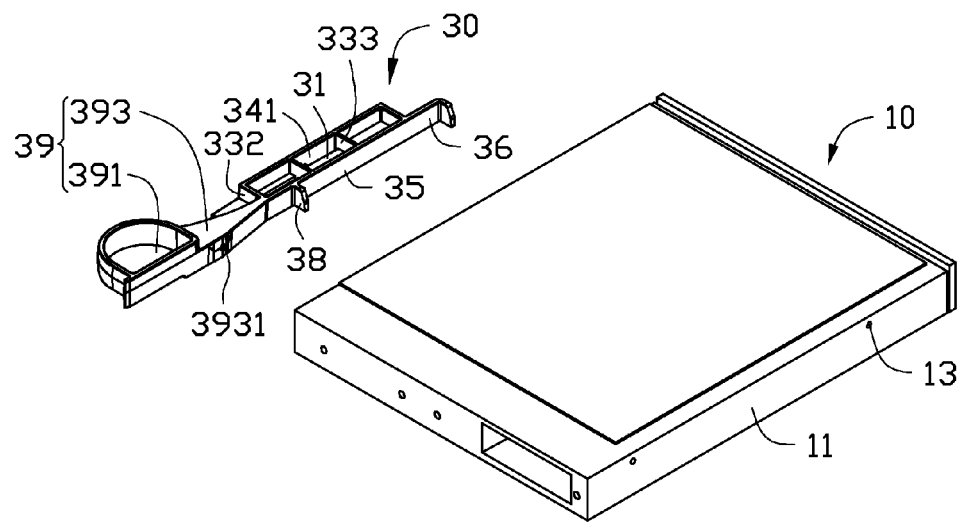
Figure 3:
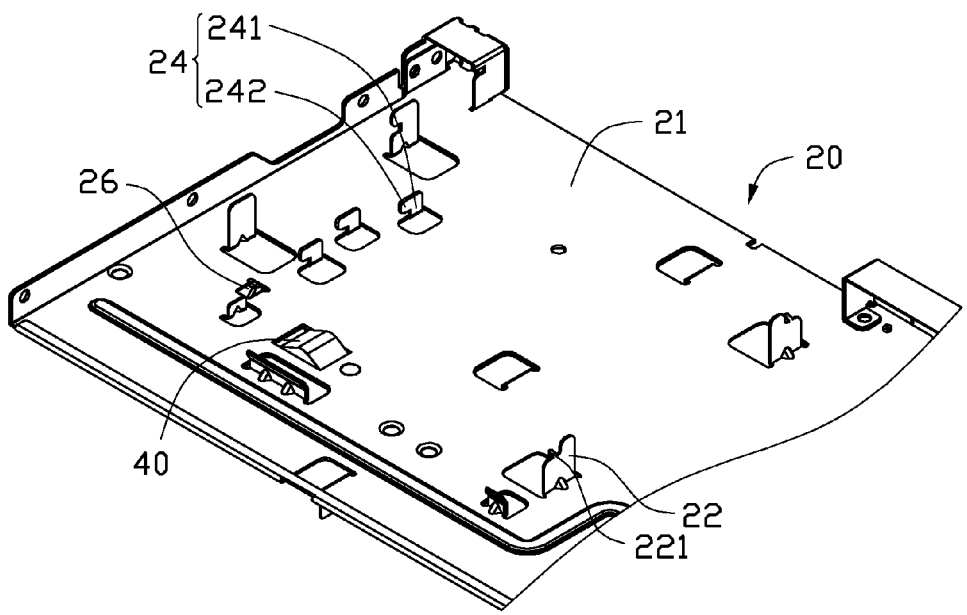

FIGS. 1-3, show an exemplary embodiment of a fastening device for fastening a data storage device, such as an optical disk drive (ODD) 10, including a rack 20 and a fastening member 30.

The ODD 10 includes a first sidewall 11 and a second sidewall 12 opposite to the first sidewall 11. Two spaced holes 13 are defined in the first sidewall 11. A locking hole 15 is defined in the second sidewall 12.

The rack 20 includes a bottom plate 21. Two stop tabs 22 protrude up from the bottom plate 21, in alignment with each other. Three L-shaped positioning tabs 24 protrude from the bottom plate 21, opposite to the stop tabs 22. Each positioning tab 24 includes a first positioning portion 241 extending perpendicularly up from the bottom plate 21 and a second positioning portion 242 extending backward from a top of the first positioning portion 241. A pin 221 protrudes from each stop tab 22 toward the positioning tabs 24. A block 26 protrudes up from the bottom plate 21, at a rear side of the position tabs 24. A resilient tab 40 protrudes up from the bottom plate 21, between the stop tabs 22 and the position tabs 24. The resilient tab 40 is arced up to form a bridge-shape.

Figure 4:
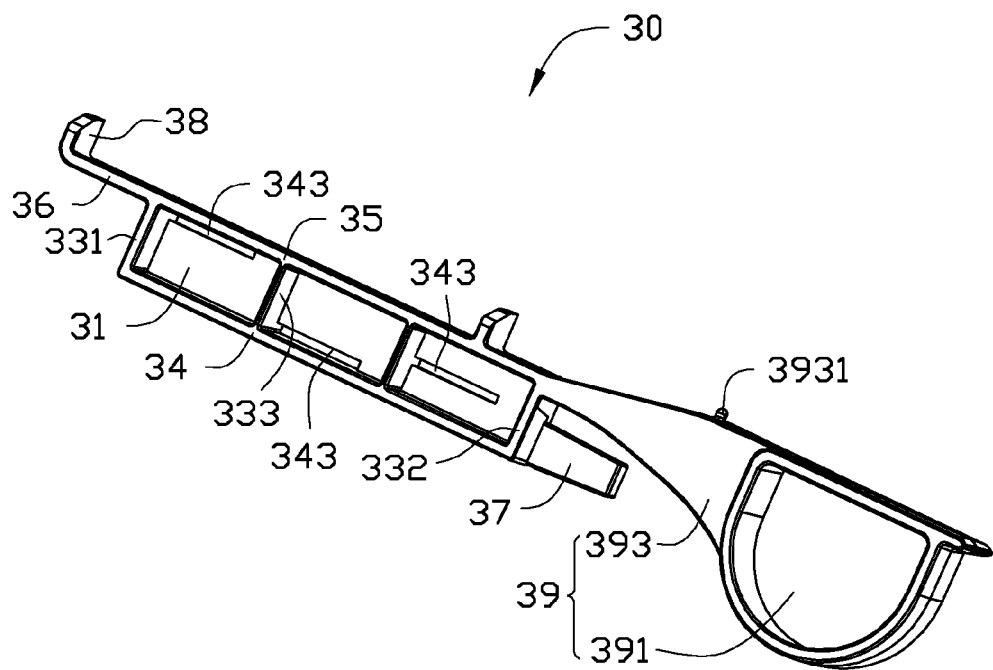
FIG. 4 is an enlarged view of the fastening member of FIG. 1, but viewed from another perspective.

FIGS. 2-4, show the fastening member 30 including a rectangular main body 32, a resilient portion 39, and a resilient block 37. The main body 32 includes a bottom wall 31, two opposite sidewalls 34 and 35 perpendicularly extending up from opposite sides of the bottom wall 31, and a front end wall 331 and a rear end wall 332 respectively connected between opposite ends of the sidewalls 34 and 35. An extension wall 36 extends forward from a front end of the sidewall 35. The main body 32 forms two connection walls 333 connected between the sidewalls 34 and 35, dividing the main body 32 into three recesses 341, together with the front and rear end walls 331 and 332. The bottom wall 31 respectively defines two longitudinal through slots 343 in the recesses 341, a first one, in the front recess 341 is adjacent to the sidewall 35, a second one, in the middle recess 341 is adjacent to the sidewall 34, and a third, in the rear recess 341 is in a middle of the bottom wall 31. The through slots 343 are parallel to the sidewall 34. Two abutting portions 38 respectively and perpendicularly extend from a front end of the extension wall 36 and a back portion of the sidewall 35. The resilient block 37 extends backward from a lower portion of the rear end wall 332, adjacent to the sidewall 34. The resilient portion 39 extends from the rear end wall 332, adjoining the sidewall 35. The resilient portion 39 includes a substantially D-shaped handle 391 and a connection plate 393 connected between the rear end wall 332 and the handle 391. A pin 3931 protrudes from the connection plate 393, at the same side with the abutting portions 38.

FIG. 1, shows in assembly, the fastening member 30 placed above the positioning tabs 24, and manipulated to make the through slots 343 align with the corresponding positioning tabs 24. The fastening member 30 is moved down, until the bottom wall 31 abuts against the bottom plate 21, the resilient block 37 abuts against a top of the block 26, and the positioning tabs 24 extend through the corresponding through slots 343. The fastening member 30 is moved forward, the second positioning portions 242 abut against a top surface of the bottom wall 31. When the rear end walls bounding the through slots 343 are blocked by the corresponding first positioning portions 241, the resilient block 37 slides down from the block 26 to abut against a front end of the block 26. Therefore, the fastening member 30 is fixed to the rack 20.

To fix the ODD 10, a first side of the ODD 10 adjacent to the first sidewall 11 is placed to the bottom plate 21, with the ODD 10 located between the stop tabs 22 and the fastening member 30. The pins 221 engage in the corresponding holes 13. The handle 391 is deformed away from the ODD 10. A second side of the ODD 10 adjacent to the second sidewall 12 is moved down, to the bottom plate 21. The first sidewall 11 abuts against the stop tabs 22. The second sidewall 12 abuts against the abutting portions 38. The ODD 10 is pressed down, with a bottom wall of the ODD 10 abutting against the resilient tab 40, thereby deforming the resilient tab 40. The handle 391 is released. The resilient portion 39 is self-restored, to allow the pin 3931 to engage in the locking hole 15. Therefore, the ODD 10 is fixed to the rack 20 and the fastening member 30.

To detach the ODD 10, the handle 391 is deformed away from the ODD 10, to allow the pin 3931 to disengage from the locking hole 15. The resilient tab 40 is self-restored, to move the ODD 10 up. The ODD 10 is moved up further by an external force such as a finger, to disengage the pins 221 from the corresponding holes 13. Therefore, the ODD 10 is disassembled from the rack 20 and the fastening member 30.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A fastening device for fastening a data storage device, the fastening device comprising:

a rack comprising a bottom plate to support the data storage device and two stop tabs protruding up from the bottom plate to abut against a first sidewall of the data storage device, two first pins respectively extending from the stop tabs to engage in two holes defined in the first sidewall of the data storage device; and a fastening member comprising a main body attached to the bottom plate to abut against a second sidewall of the data storage device, and a resilient portion extending from the main body, a second pin protruding from the resilient portion to engage in a locking hole defined in the second sidewall of the data storage device;

wherein the main body comprises a sidewall facing the stop tabs and a bottom wall perpendicular to the sidewall, an abutting portion perpendicularly extends from the sidewall to abut against the second sidewall of the data storage device, the bottom wall defines a through slot parallel to the sidewall, a positioning tab protrudes from the bottom plate, the positioning tab comprises a first positioning portion extending up from the bottom plate to extend through the through slot from a bottom of the bottom wall, and a second positioning portion extending from a top of the first positioning portion to abut against a top of the bottom wall.

2. The fastening device of claim 1, wherein a resilient block extends from an end of the main body adjacent to the resilient portion, a block protrudes from the bottom plate to block the resilient block.

3. The fastening device of claim 1, wherein a resilient tab extends up from the bottom plate to be resiliently sandwiched between the data storage device and the bottom plate.

4. The fastening device of claim 3, wherein the resilient tab is arced up to form a bridge-shape.

5. The fastening device of claim 1, wherein the resilient portion comprises a handle and a connection plate connected between the handle and the main body, the second pin protrudes from the connection plate, the handle is operable to deform the resilient portion, thereto allow the second pin to disengage from the locking hole.

* * * * *